United States Patent
Serebryany et al.

(10) Patent No.: US 8,762,797 B2
(45) Date of Patent: Jun. 24, 2014

(54) METHOD AND APPARATUS FOR DETECTING MEMORY ACCESS FAULTS

(75) Inventors: Konstantin Serebryany, Moscow (RU); Derek Bruening, Troy, NY (US)

(73) Assignee: Google Inc., Mountain View, CA (US)

(*) Notice: Subject to any disclaimer, the term of this patent is extended or adjusted under 35 U.S.C. 154(b) by 213 days.

(21) Appl. No.: 13/453,423

(22) Filed: Apr. 23, 2012

(65) Prior Publication Data

US 2012/0278665 A1 Nov. 1, 2012

Related U.S. Application Data

(60) Provisional application No. 61/480,812, filed on Apr. 29, 2011.

(51) Int. Cl.
| G06F 11/00 | (2006.01) |
| G06F 11/07 | (2006.01) |
| G06F 11/36 | (2006.01) |

(52) U.S. Cl.
CPC ........ *G06F 11/3644* (2013.01); *G06F 11/0793* (2013.01); *G06F 11/366* (2013.01); *G06F 11/073* (2013.01)
USPC .......................................................... 714/702

(58) Field of Classification Search
None
See application file for complete search history.

(56) References Cited

U.S. PATENT DOCUMENTS

| 5,590,329 | A | 12/1996 | Goodnow, II et al. |
| 5,644,709 | A | 7/1997 | Austin |
| 5,946,486 | A | * 8/1999 | Pekowski ...................... 717/128 |
| 6,028,967 | A | 2/2000 | Kim et al. |
| 6,085,029 | A | 7/2000 | Kolawa et al. |
| 6,263,114 | B1 | 7/2001 | Saunders |
| 6,363,119 | B1 | 3/2002 | Oami |
| 6,542,990 | B1 | 4/2003 | Tremblay et al. |
| 6,681,299 | B1 | * 1/2004 | Shimamura et al. .......... 711/145 |
| 6,700,809 | B1 | * 3/2004 | Ng et al. ...................... 365/49.1 |
| 7,114,104 | B1 | 9/2006 | Bennett |

(Continued)

FOREIGN PATENT DOCUMENTS

| EP | 1605403 | 12/2005 |
| EP | 2048887 | 4/2009 |
| WO | WO03021969 | 3/2003 |

OTHER PUBLICATIONS

Nethercote, Nicholas, et al.; "How to Shadow Every Byte of Memory Used by a Program", Proceedings of the 3rd International Conference on Virtual Execution Environments, Jun. 13-15, 2007 San Diego CA, pp. 65-74.

(Continued)

*Primary Examiner* — Christopher McCarthy
(74) *Attorney, Agent, or Firm* — Young, Basile, Hanlon & MacFarlane, P.C.

(57) ABSTRACT

Detecting a fault in the operation of a computer having a processor and a memory is taught. Instrumentation code is placed within an application program during compilation, and runtime library routines are modified to support detection of invalid memory accesses. Memory space is divided into application, shadow and unmapped memories. When accessing application memory at an original address, an address in shadow memory is computed by shifting the address and adding an offset. If the value stored at the shadow address indicates that the original address is invalid (e.g., not allocated or already freed), then error reporting code is executed that indicates the type of error and the location and optionally halts the computer. Invalid memory references to heap, stack and global objects in application memory can be detected.

20 Claims, 5 Drawing Sheets

(56) References Cited

U.S. PATENT DOCUMENTS

| | | | |
|---|---|---|---|
| 7,185,125 B2* | 2/2007 | Rougnon-Glasson | 710/52 |
| 7,216,135 B2* | 5/2007 | Sawdon et al. | 1/1 |
| 7,218,674 B2 | 5/2007 | Kuo | |
| 7,487,314 B1* | 2/2009 | Agesen et al. | 711/163 |
| 7,681,077 B1* | 3/2010 | Eitzmann et al. | 714/21 |
| 7,734,893 B2* | 6/2010 | Hattori et al. | 711/209 |
| 7,768,515 B1* | 8/2010 | Eitzmann et al. | 345/501 |
| 7,836,434 B1 | 11/2010 | Boucher | |
| 7,856,538 B2 | 12/2010 | Speirs, II et al. | |
| 8,055,864 B2* | 11/2011 | Sawdon et al. | 711/162 |
| 2003/0053541 A1 | 3/2003 | Sun et al. | |
| 2003/0140238 A1* | 7/2003 | Turkboylari | 713/193 |
| 2004/0114568 A1* | 6/2004 | Beverly | 370/351 |
| 2005/0265447 A1 | 12/2005 | Park | |
| 2005/0283770 A1 | 12/2005 | Karp et al. | |
| 2006/0277371 A1 | 12/2006 | Cohn et al. | |
| 2007/0065026 A1 | 3/2007 | Lee et al. | |
| 2007/0156986 A1* | 7/2007 | Neiger et al. | 711/163 |
| 2008/0013844 A1 | 1/2008 | Hu | |
| 2008/0225947 A1 | 9/2008 | Narroschke et al. | |
| 2009/0043978 A1* | 2/2009 | Sawdon et al. | 711/162 |
| 2010/0086028 A1 | 4/2010 | Tanizawa et al. | |
| 2010/0104021 A1 | 4/2010 | Schmit | |
| 2010/0118945 A1 | 5/2010 | Wada et al. | |
| 2010/0128796 A1 | 5/2010 | Choudhury | |
| 2010/0166061 A1 | 7/2010 | Kondo et al. | |
| 2010/0177819 A1 | 7/2010 | Jeon et al. | |
| 2010/0257511 A1* | 10/2010 | Hatabu | 717/131 |
| 2010/0260268 A1 | 10/2010 | Cowan et al. | |
| 2011/0026591 A1 | 2/2011 | Bauza et al. | |
| 2011/0038410 A1 | 2/2011 | Narroschke et al. | |
| 2011/0082962 A1* | 4/2011 | Horovitz et al. | 711/6 |
| 2011/0173505 A1* | 7/2011 | Bae et al. | 714/48 |
| 2011/0197190 A1* | 8/2011 | Hattori et al. | 718/1 |

OTHER PUBLICATIONS

Zhao, Qin, et al.; "Efficient Memory Shadowing for 64-bit Architectures", Proceedings of the 2010 International Symposium on Memory Management, Jun. 5, 2010, pp. 93-102.

International Search Report and Written Opinion mailed Jul. 16, 2012, for PCT/US2012/034635 (13 pp).

Arbeiter, J. H. et al.; "A Two-Dimensional Real-Time Video Pyramid Processor", RCA Review, RCA Corp. Princeton, US, vol. 47, No. 1, Mar. 1, 1986, pp. 3-31.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Cassidy, An analysis of VP8, a new video codec for the web, 148 pages. Nov. 2011.

Chee, Y-K.; "Survey of Progressive Image Transmission Methods", International Journal of Imaging Systems and Technology, Wiley and Sons, New York, US, vol. 10, No. 1, Jan. 1, 1999, pp. 3-19.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Overview; VP7 Data Format and Decoder. Version 1.5. On2 Technologies, Inc. Dated Mar. 28, 2005.

Pai, et al., MPEG 4 constant quality constant bit rate control algorithms, signal processing:image communication, Jan. 2005, vol. 21, Issue 1, pp. 67-89.

Park, Jun Sung, et al., "Selective Intra Prediction Mode Decision for H.264/AVC Encoders", World Academy of Science, Engineering and Technology 13, (2006).

Price, Thomas B.; "Muscle and Liver Carbohydrates: Response to Military Task Performance by Women and Men", Oct. 1, 1997, http://www.dtic.mil/docs/citations/ADA337501, p. 10.

Schrieber W.F.; "Advanced Television Systems for Terrestrial Broadcasting: Some Problems and Some Proposed Solutions", Proceedings of the IEEE, IEEE New York, US, vol. 83, No. 6, Jun. 1, 1995, pp. 958-981.

Schwarz H. et al.: "SNR-scalable extension of H.264/AVC", Image Processing, 2004. ICIP 2004 International Conference on Singapore Oct. 24-27, 2004.

Series H: Audiovisual and Multimedia Systems; Infrastructure of audiovisual services- Coding of moving video. H.264. Advanced video coding for generic audiovisual services. International Telecommunication Union. Version 11. Dated Mar. 2009.

Series H: Audiovisual and Multimedia Systems; Infrastructure of audiovisual services- Coding of moving video. H.264. Advanced video coding for generic audiovisual services. International Telecommunication Union. Version 12. Dated Mar. 2010.

Series H: Audiovisual and Multimedia Systems; Infrastructure of audiovisual services- Coding of moving.video. H.264. Amendment 2: New profiles for professional applications. International Telecommunication Union. Dated Apr. 2007.

Series H: Audiovisual and Multimedia Systems; Infrastructure of audiovisual services- Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services- Coding of moving video; Advanced video coding for generic audiovisual services. H.264. Amendment 1: Support of additional colour spaces and removal of the High 4:4:4 Profile. International Telecommunication Union. Dated Jun. 2006.

Series H; Audiovisual and Multimedia Systems; Infrastructure of audiovisual services- Coding of moving video; Advanced video coding for generic audiovisual services. H.264. Version 1. International Telecommunication Union. Dated May 2003.

Series H: Audiovisual and Multimedia Systems; Infrastructure of audiovisual services- Coding of moving video; Advanced video coding for generic audiovisual services. H.264. Version 3. International Telecommunication Union. Dated Mar. 2005.

Shimono et al.; "Transform Image Coding With Edge Compensation", Electronics and Communication in Japan, Part I: Communications, Hoboken, NJ, US, vol. 74, No. 10, Oct. 1, 1991, pp. 49-56.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

\* cited by examiner

METHOD AND APPARATUS FOR DETECTING MEMORY ACCESS FAULTS

CROSS-REFERENCE TO RELATED APPLICATION

This application claims priority to U.S. 61/480,812, filed Apr. 29, 2011, which is incorporated herein in its entirety by reference.

TECHNICAL FIELD

The present disclosure relates in systems for managing memory in computers and in particular to detecting attempts by a computer program to access memory that is not properly allocated for such access.

BACKGROUND

Computer programs execute on computers that typically include a processor and memory, such as random access memory. Physical memory is often managed by a computer's operating system to create a virtual memory space. It is this virtual memory space that is accessed by application programs to store and later read information. Memory is organized into locations, each having a unique address.

Typically, an application program can call an operating system procedure to allocate memory for use by the program. An example of such a command is the malloc command in the C programming language. When the memory is no longer required, the program can call an operating system procedure to free the memory so that it can be re-used by the program. Other types of memory that can automatically be allocated by the operating system on behalf of an application program can be stack and heap memory, for example.

SUMMARY

Teachings herein allow the detection of a fault in the operation of a computer having a processor and memory. In one embodiment, a method includes identifying a first portion of the memory and a second portion of the memory, each addressable by an application program operating on the computer, identifying an instruction within the application program that results in the computer performing a memory access to a first address within the first portion, determining a second address within the second portion, the second address determined by applying a first arithmetic operation to the first address, and determining a first value stored in memory at the second address, the first value indicative of whether the first address is allocated for use by the application program. If the first value indicates that the first address is not allocated for use by the application program, error reporting code is executed indicating that an improper memory access has been attempted. The first and second portions of the memory are non-overlapping.

Aspects of an apparatus for detecting a fault in the operation of a computer are also taught. One example of an apparatus includes a memory and a processor configured to execute instructions stored in the memory to identify a first portion of the memory and a second portion of the memory, each addressable by an application program operating on the computer, wherein the first portion and the second portion are non-overlapping, identify an instruction within the application program that results in the computer performing a memory access to a first address within the first portion, determine a second address within the second portion, the second address determined by applying a first arithmetic operation to the first address, determine a first value stored in memory at the second address, the first value indicative of whether the first address is allocated for use by the application program, and, if the first value indicates that the first address is not allocated for access by the application program, execute error reporting code indicating that an improper memory access has been attempted.

Details and variations in these embodiments and others are described in additional detail below.

BRIEF DESCRIPTION OF THE DRAWINGS

The description herein makes reference to the accompanying drawings wherein like reference numerals refer to like parts throughout the several views, and wherein.

DETAILED DESCRIPTION

It is possible that a program will attempt to access a memory location at an address that has not been properly allocated. This leads to memory operations such as read and write that can corrupt previously written data or access erroneous data. These erroneous memory operations can result in a runtime error. At times, however, errors may not be detected, resulting in corruption of data and incorrect program output. For example, an application program may attempt to read or write a memory location after the location has already been released from the application program's active memory space. This is referred to as a "use-after-free" error. An application may also attempt to read a memory location that is outside the bounds of the active memory space allocated to that application. This is referred to as an "out-of-bounds" error.

Tools exist to detect memory access errors. These tools typically allocate a region in memory referred to as a shadow memory, which contains shadow values indicating whether corresponding active memory locations have been properly allocated for use by an application. If the application attempts to access a location that has not been properly allocated, these tools detect this access and call further functions to analyze and report the error. Existing tools typically have large memory overhead, significant processor burden, or both.

In contrast, the teachings herein detect memory access errors with minimal processor and/or memory overhead. According to one implementation, the shadow state of each memory access is checked. Areas are created around allocated memory objects to detect overflows and underflows. In addition, the reuse of freed memory is delayed and error reporting is done.

Figure 1:
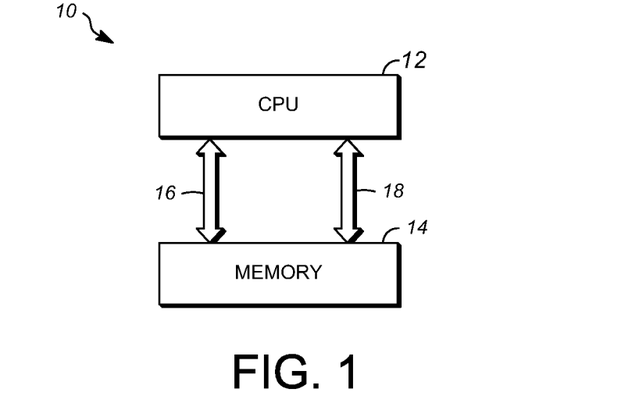
FIG. 1 is a block diagram of a computer in which embodiments taught herein can be implemented.

Referring to FIG. 1 a block diagram of a computer 10 is illustrated. Computer 10 includes a processor 12 and a memory 14. Processor 12 can be a single central processing unit (CPU), or alternatively can include multiple processors or cores. In this case processor 12 is a 64-bit processor. This configuration is purely for purposes of illustration. Computer 10 can be a personal computer, mainframe computer, servers, or any other computing device. Likewise, processor 12 can be any type of device capable of manipulating or processing information now-existing or hereafter developed including optical processors, quantum processors and/or molecular processors, general purpose processors, special purpose processors, Intellectual property (IP) cores, application-specific integrated circuits (ASICS), programmable logic arrays, programmable logic controllers, microcode, firmware, microcontrollers, microprocessors, digital signal processors, memory, or any combination of the foregoing. The term "processor" should be understood as including any the foregoing, either singly or in combination.

Memory 14 is random access memory (RAM) in this example, although any other suitable type of storage device can be used. Generally, processor 12 receives program instructions and data from the memory 14, which can be used by processor 12 for performing methods described below. Memory 14 can be in the same unit as processor 12 as shown in the example of FIG. 1 or can be located in a separate unit that is coupled to processor 12.

Processor 12 can access specific locations in memory 14 by placing the location's address onto an address bus 16. The contents in the specified location of memory 14 are then accessed by processor 12 on a data bus 18. Memory 14 is virtualized so that application programs running on processor 12 can address a virtual memory space as opposed to physical locations within memory 14. The operating system of computer 10 manages this virtual memory space.

Application programs operating on computer 10 can include an instrument which can be incorporated into the program when it is compiled. The instrument is a piece of software that is not necessarily accessible to the designers of the application program. It can be executed when the application program attempts to access memory. See below for further discussion of this process in connection with FIG. 6.

Figure 2:
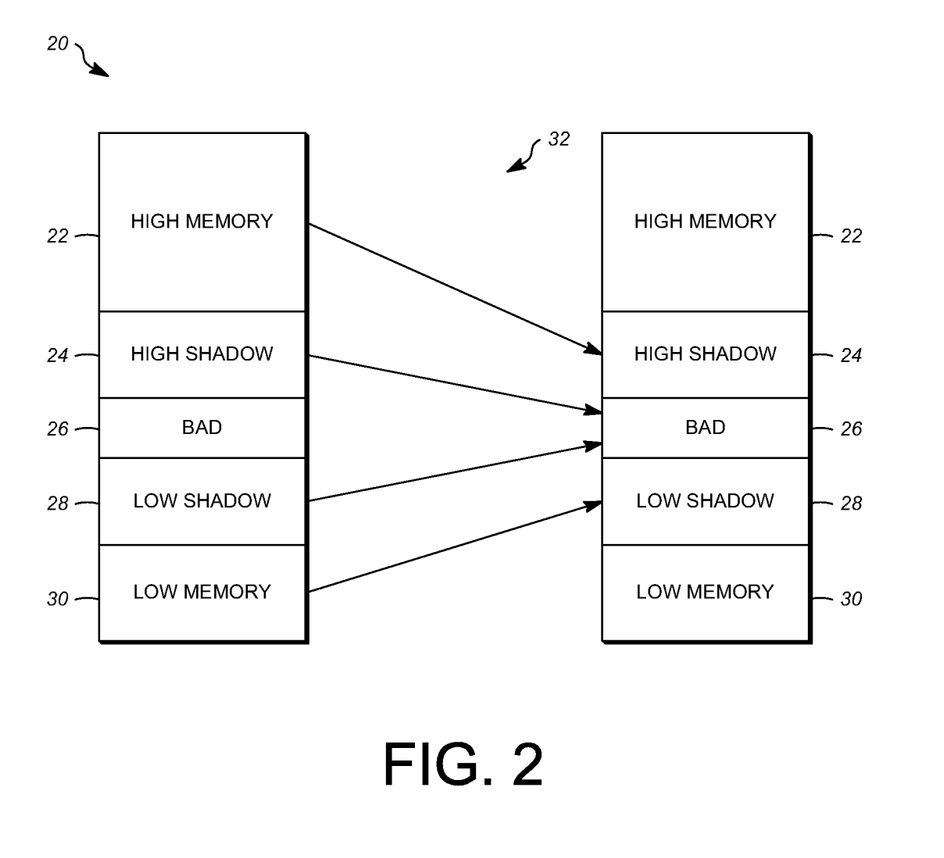
FIG. 2 is a schematic diagram of memory space used by a computer program running on the computer of FIG. 1.

FIG. 2 is a schematic diagram of memory space 20 used by a computer program loaded into computer 10 of FIG. 1. Five memory regions 22, 24, 26, 28 and 30 are identified in memory space 20 in this example. The terms regions and portions are used interchangeably to refer to contiguous subsets of a memory space having a lower address or bound and an upper address or bound. As used herein, "identifies" means to select, construct, determine, specify or otherwise identify in any manner whatsoever. Memory space 20 is virtual in this case. However, other embodiments could be implemented with physical memory addresses. Memory portions 22, 24, 28 and 30 can be addressable by an application program or not addressable by an application program. Addressable by an application program means that the application program can successfully access addresses within the range defined by the memory portion. Not addressable means that the memory portion is protected by the operating system, so that an attempt by the application program to access addresses in the address range defined by the memory portion may result in an error signal being generated. Such an error signal can cause computer 10 to halt execution of the application program. Accessing memory means attempting to write and/or read values to and from addresses within the address ranges defined by a memory portion. Instructions included in an application program can be inspected prior to execution to determine which memory addresses they will attempt to access. In this way, the memory portion to be accessed by an instruction can be identified before actually attempting access, thereby permitting a check to see if the memory portion to be accessed through performance of the identified instruction includes an address that has been properly allocated by the application program.

In this example, region 30 is designated in FIG. 2 as "low memory" and is a region of memory allocable by the application program for use in storing data. Region 28 is designated as "low shadow" and is a memory region used by the instrument to track which locations in low memory 30 have been allocated for use by the program. Region 26 is designated as "bad" and is a memory region that is unmapped and not available for use by the program. An attempt to access bad memory 26 by either the application program or the instrument will cause computer 10 to generate a run-time error signal, such as a page fault in this example.

Region 22 is designated as "high memory" and is a region of memory allocable by the program for use in storing data in this example. Finally in this example, region 24 is designated as "high shadow" and is a memory region used by the instrument to track which locations in high memory 22 have been allocated for use by the program.

Addresses in low memory 30 and high memory 22 are sometimes referred to herein as "original" addresses. Addresses in low shadow memory 28 and high shadow memory 24 are sometimes referred to herein as "shadow" addresses.

The arrows 32 in FIG. 2 represent memory mappings that can be performed according to the teachings herein. A memory mapping can be defined as an address translation wherein addresses that access a certain memory portion are translated into addresses that access a different memory portion. Mappings can be reversible, in that if a first address that accessed a first memory portion is mapped into a second address that accesses a second memory portion, the second address can be remapped back into the first address accessing the first memory portion without loss of information.

Mapping can establish a relationship between memory addresses wherein an address in one memory region can be converted to an address into another memory region such that each unit of data from one memory region can be represented by a possibly different unit of data in another memory region. For example, a disclosed embodiment can map addresses of bytes of high or low memory into addresses of bits of high or low shadow memory. With respect to FIG. 2, high memory 22 is available for application software access and is mapped to high shadow memory 24. Low memory 30 is available for application software access and is mapped to low shadow memory 28. High shadow memory 24 and low shadow memory 28 are mapped to bad memory 26. In this example, each eight-bit byte of shadow memory can represent eight bytes of high or low user memory regions, thereby achieving an eight-to-one reduction in memory size for the shadow memory.

Table 1 below contains hexadecimal addresses in 64-bit notation corresponding to the memory allocations of memory space 20 in FIG. 2.

| Start Address | End Address | Name |
|---|---|---|
| 0x00007f0000000000 | 0x0000800000000000 | High Memory |
| 0x00001f0000000000 | 0x0000200000000000 | High Shadow |
| 0x0000080000000000 | 0x0000100000000000 | Bad |
| 0x0000040000000000 | 0x0000080000000000 | Low Shadow |
| 0x0000000000000000 | 0x0000040000000000 | Low Memory |

The first column labeled Start Address in Table 1 contains the lowermost address (in hexadecimal notation) of each memory region. The second column labeled End Address contains the uppermost address (in hexadecimal notation) of each memory region. The third column labeled Name contains a mnemonic for each memory region.

The lower and upper bounds of memory regions 22 through 30 are set forth in columns Start Address and End Address, respectively, of Table 1. The lower bound of low memory 30 is zero. The upper bound of low memory 30 is selected to provide adequate memory for the application program. Here, the upper bound of high memory 30 is equal to $2^k$, where k=42, resulting in an upper bound of 0x 40000000000 as shown in column End Address. Other values of k can be used although values near 40 are typically useful. In this example, the memory regions in Table 1 are non-overlapping. Accordingly, the End Addresses in column 2 are non-inclusive—meaning that the memory regions defined by the End Addresses are defined to be "up to but not including" the End Address. For example, the last address included in the low memory region 30 is the last address before address 0x0000040000000000.

As shown, regions 26 through 30 are essentially contiguous. The lower bound (as shown in column Start Address) of low shadow memory 28 is equal to the upper bound (as shown in column End Address) of low memory 30. The upper bound of low shadow memory 28 is equal to $2^{(k+1)}$—that is, 0x 80000000000. Thus, low shadow memory 28 is the same size as low memory 30. The lower bound (Start Address) of bad memory 26 is equal to the upper bound (End Address) of low shadow memory 28. The upper bound of bad memory 26 is set to $2^{(k+2)}$—that is, 0x 100000000000.

Regions 24 and 22 are arranged in memory in a different order than regions 26 through 30. Specifically, high shadow memory 24 has a lower bound (Start Address) equal to 0x 00001f0000000000 and an upper bound (End Address) equal to $2^{(k+3)}$, in this case 0x 200000000000. High memory 22 has a lower bound (Start Address) equal to 00007f0000000000 and an upper bound (End Address) equal to $2^{(k+4)}$, in this case 0x 800000000000. It will be seen that the lower bounds of regions 24 and 22 are offset from the upper bounds of their adjacent lower region. Thus, for example, the lower bound of high memory 22 is offset slightly from the upper bound of high shadow memory 24.

Figure 3:
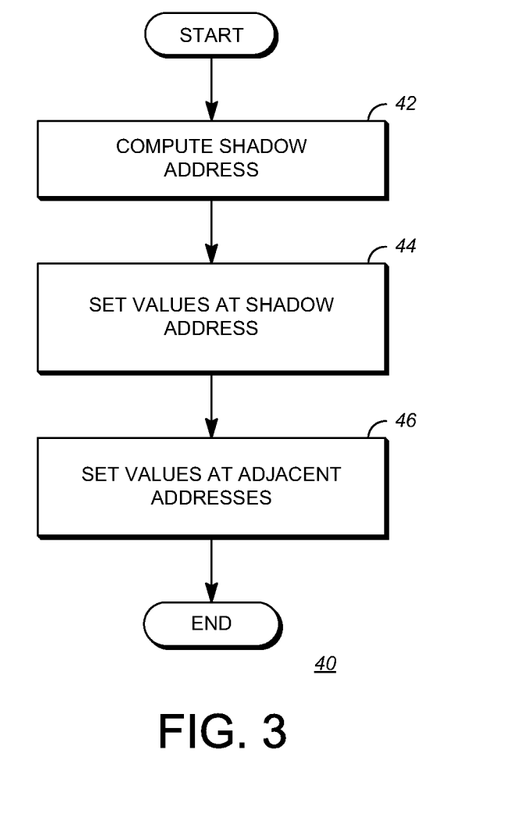
FIG. 3 is a flowchart of a process to allocate or free memory according to an embodiment.

FIG. 3 is a flowchart of a process 40 to allocate or free memory according to a disclosed embodiment. Process 40 can occur during execution of an application program loaded into computer 10, when program instructions may invoke operating system functions to allocate or free a block of memory in either low memory 30 or high memory 22 such as when the program issues a malloc instruction to allocate a block of memory in low memory 30. Process 40 can be performed by the application program running on computer 10 using instrumentation code (e.g., an instrument or instrumentation module) inserted into the program when it was compiled (see discussion below relating to FIG. 6).

In the processing of FIG. 3, the application program computes shadow addresses corresponding to the lower and upper addresses of the allocated block of application memory in low memory 30. For example, suppose 4096 bytes are allocated in a block of low memory 30 ranging between an original lower address 0x 0000 and an original upper address of 0x 1000. (An example of this computation is provided below.) In that case, shadow addresses corresponding to original lower address 0x 0000 and original upper address 0x 1000 are calculated, thus defining a block of shadow memory in low shadow memory 28 that corresponds with the allocated block of memory in low memory 30. Thus, for a particular location in low memory 30 at an arbitrary address (e.g., 0x 0000000000000100), there is a corresponding location in low shadow memory 28. In disclosed embodiments, the relationship can be variable. For example, a byte of shadow memory could correspond to an eight-byte word of regular memory, thus reducing the amount of shadow memory required. An example of address mapping is given in equation (1), discussed below.

At step 44, values at locations in low shadow memory 28 are set by the instrumentation code. For example, when a block of memory in low memory 30 is allocated to the application program containing the instrument, the values of each location in the corresponding block of memory in low shadow memory 28 can be set to zero. The zero value in a particular location of low shadow memory 28 is an indication that the corresponding location of low memory 30 is properly allocated to the application program. For example, 0 can mean that all bytes (e.g., 8 bytes) of the corresponding application memory, in this case low memory 30, are addressable. Zero is chosen as an arbitrary example of the value indicating proper allocation. Disclosed embodiments can also use values 1 through 7, for example, to indicate which bytes of an eight-byte word addressed by an address in application memory (e.g., high or low memory) are properly allocated. For example, a value of 1 indicates that one byte of the corresponding application memory is addressable.

At step 46, the value of other locations in low shadow memory 28 is set to, for example, a negative value such as −1. The existence of a negative value in this example indicates that the entire eight-bit word is unaddressable, that is, that the corresponding locations in low memory 30 are not allocated for use by the application program. In a variation, different negative values can be used to distinguish between different kinds of unaddressable memory (e.g., memory addresses not allocated for use). Unaddressable memory can include, for example, heap redzones, stack redzones, global redzones and freed memory, and each of these can be assigned a unique negative value. In such an example, unaddressable heap and stack memory (e.g., parts of high memory 22) can be mapped to high shadow memory 24 and assigned respective negative values, while unaddressable global memory (e.g., part of low memory 30) can be mapped to low shadow memory 28 with a different negative value. Unaddressable freed memory could be assigned its own negative value when mapped to the appropriate shadow memory. The "poison" or "red" zones represented by negative numbers can alert the instrumentation code that an illegal memory access is being attempted by the application program. Process 40 ends after step 46.

At run-time, an application program can invoke system functions to free a block of previously allocated memory in low memory 30. In this case, the processing at step 44 can set to one the values of each location in the block of memory in low shadow memory 28 that corresponds to the previously allocated (but now free) block of memory in low memory 30. A negative value in low shadow memory 28 is indicative that the corresponding location in low memory 30 is no longer properly allocated for use by the application program.

Standard ways of allocating and de-allocating memory can reduce the size or presence of redzones by allocating memory in blocks contiguous to previously-allocated memory. Disclosed embodiments can prevent this from happening by placing de-allocated memory blocks into a first-in-first-out buffer large enough to hold several de-allocated memory blocks, for example 256 MB. In this way, blocks of memory will tend to be spread throughout the memory space and permit redzones or guard bytes to be allocated for most memory allocations.

While the preceding example illustrates the allocation and de-allocation of memory in low memory 30, the process of FIG. 3 can be followed for allocation and de-allocation of memory in high memory 22 except that the shadow addresses corresponding to the lower and upper addresses of the allocated block of application memory in high memory 22 would fall in high shadow memory 24 as opposed to low shadow memory 28.

As explained above in connection with the performance of step 42, shadow addresses—that is, addresses in low shadow memory 28 corresponding to original address in low memory 30 or high shadow memory 24 corresponding to original addresses in high memory 22—are calculated. By way of example, the shadow addresses are computed using a function that right-shifts (>>) the original addresses and adds an offset value to the address of high 22 or low memory 30. An example of an arithmetic operation to map addresses in application memory (i.e., high 22 or low memory 30) to addresses in shadow memory according to disclosed embodiments is as follows:

$$A_{SHADOW} = (A_{ORIGINAL} >> \text{SCALE}) + \text{OFFSET}; \quad (1)$$

wherein $A_{SHADOW}$ is the shadow address to be calculated;
$A_{ORIGINAL}$ is the original address in high memory 22 or low memory 30;
SCALE is the amount of right shift and is equal to three in this example; and
OFFSET is a value, in this case using 64-bit addressing=0x0000100000000000 ($2^{44}$), used to convert the shifted address (e.g., from low memory 30 into low shadow memory 28). The value of OFFSET is based on a relationship of addresses in the application memory to addresses in the target shadow memory. For example, if Max-1 is the maximum valid address is the shadow memory, the value of OFFSET could be chosen so that the region from OFFSET to OFFSET+Max/8 (when 8-byte memory is used) is not occupied at start up.

Equation (1) can apply to addresses from high memory 22 to high shadow memory 24 using a negative value for OFFSET in an example. The shadow value can be stored in a 64-byte offset to avoid bank conflict. Desirable properties of equation (1) are that it is reversible and that it can be applied to addresses in the high shadow memory 24 and low shadow memory 28 to map the addresses into bad memory 26.

An alternative example of an arithmetic operation to map addresses from application memory space to addresses in shadow memory space is by applying a low mask and a high mask to the original address. In this case, the values of the masks can be:
Mask$_{LOW}$: 0x 0000040000000000; and
Mask$_{HIGH}$: 0x 0000600000000000.
In this alternative example, a shadow address can be computed according to the formula:

$$A_{SHADOW} = (A_{ORIGINAL} \text{ OR Mask}_{LOW}) \\ \text{AND } -\text{Mask}_{HIGH}. \quad (2)$$

In equation (2), the operations OR and AND are bit-wise operations. In effect, the OR operation sets to 1 a bit in the original address to approximately double its value. This would, for example, place an original address from low memory 30 to low shadow memory 28. The AND operation sets to zero two bits in the leading byte, reducing its value from 0111 (0x 7) to 0001 (0x 1) in an example. Consequently, an original address in low memory 30 or high memory 22 is reduced by an offset equal to the high mask, resulting in a shadow address in low shadow memory 28 or high shadow memory 24, respectively. As in the previous example, the shadow value can be stored in a 64 byte offset to avoid bank conflict. It is a desirable property of the function implementing the mask that it be reversible as described above.

According to teachings herein, an eight byte word in high 22 or low memory 30 can be mapped onto a single byte of high 24 or low shadow memory 28. In cases where the mapped memory starts or ends within an 8-byte word, the value of the shadow byte from 0 to 7 can indicate on which byte of the 8-byte word the data starts or ends, with 0 representing the entire eight bytes. Greater than eight bytes can be mapped onto a single byte of shadow memory by using a value of SCALE in equation (1) equal to 4, 5, 6 or 7, for example. With a value of SCALE=N, the shadow memory occupies $\frac{1}{2}^N$ of the virtual memory space being mapped, and the minimum size of the red zone (and malloc alignment) is $2^N$ bytes and may have $2^N+1$ different values. Larger values of SCALE require less shadow memory but greater red zone sizes. In a 64-bit address space, values 1 and 2 can also be used.

Figure 4:
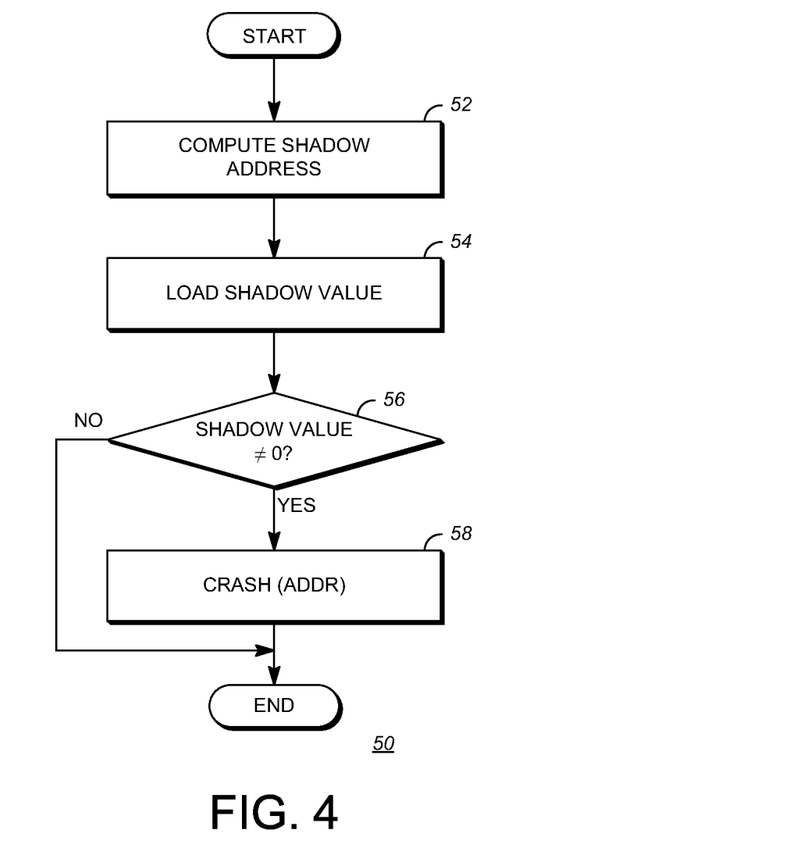
FIG. 4 is a flowchart of a process to check memory addresses according to an embodiment.

FIG. 4 is a flowchart of a process 50 to check memory addresses according to an embodiment. Process 50 can occur during execution of an application program loaded into computer 10, when the program performs a memory access. For example, during the execution of the application program, an instruction is executed within the application program that results in the computer performing or attempting to perform a memory access to a first address within the first portion of memory space 20. According to one example, the program may execute an instruction that reads from or writes to a location in virtual memory at a specified address within low memory 30 or high memory 22.

The instrument included within the application program interposes itself in process 50 of FIG. 4 when the application program attempts to access a location within memory space 20. At step 52, the application program computes a shadow address as explained above in connection with step 42 of FIG. 3. At step 54, the shadow value is read or loaded.

At decision step 56, the application program determines if the value stored in shadow memory is equal to a value that is indicative that the corresponding location in memory is properly allocated to the application program. In process 50, 8-byte memory access is instrumented. Accordingly, a value of 0 indicates that the memory location is properly allocated to the application program. If the shadow value (i.e., the value stored in shadow memory) is equal to 0 in step 56, there is no error in the memory allocations. Further processing is not required, so process 50 terminates.

For example, an application program can attempt to read a location at a specified address in low memory 30. The program computes the shadow address of the corresponding location in low shadow memory 28. If the value at the computed shadow address is equal to zero, it indicates that the corresponding address in low memory 30 is properly allocated. No further processing is necessary because an error has not occurred.

However, if the value at the computed shadow address is not equal to zero in step 56 (e.g., it is a negative or positive number), then it can be judged that the corresponding location of low memory 30 is not properly allocated to the application program. The attempt by the program to read memory at that location results in an error such as a use-after-free access error or an out-of-bounds access error. In that case, the application program performs error handling at step 58.

At step 58, error reporting code included in the application program when compiled is executed by, for example, CPU 12. It is desirable in some embodiments that the error reporting code be compact because it is generally inserted many places in the application program code although it is executed only once in the described embodiment. In one example, the error reporting code is a simple error function call Crash(Addr) with the offending address as the argument. This function can simply halt the application program or can perform more complex error recovery tasks. According to an implementation of the teachings herein, one of a number of separate "Crash" functions can be called that, in addition to passing the offending address as an argument, indicate what type of error caused the halt, such as read, write and size of the data access. For example, separate function calls can pass the following information to a run-time library discussed below: the size of access (e.g., one of 1, 2, 4, 8 or 16); and the type of address (e.g., read/load or write/store). Other error reporting code to be executed can be an instruction that generates a hardware exception, which can include a segmentation fault (SEGV), or generates a software exception, which can include an illegal instruction fault (SIGILL), in place of or in addition to executing an error function call. Process 50 can terminate after step 58.

Figure 5:
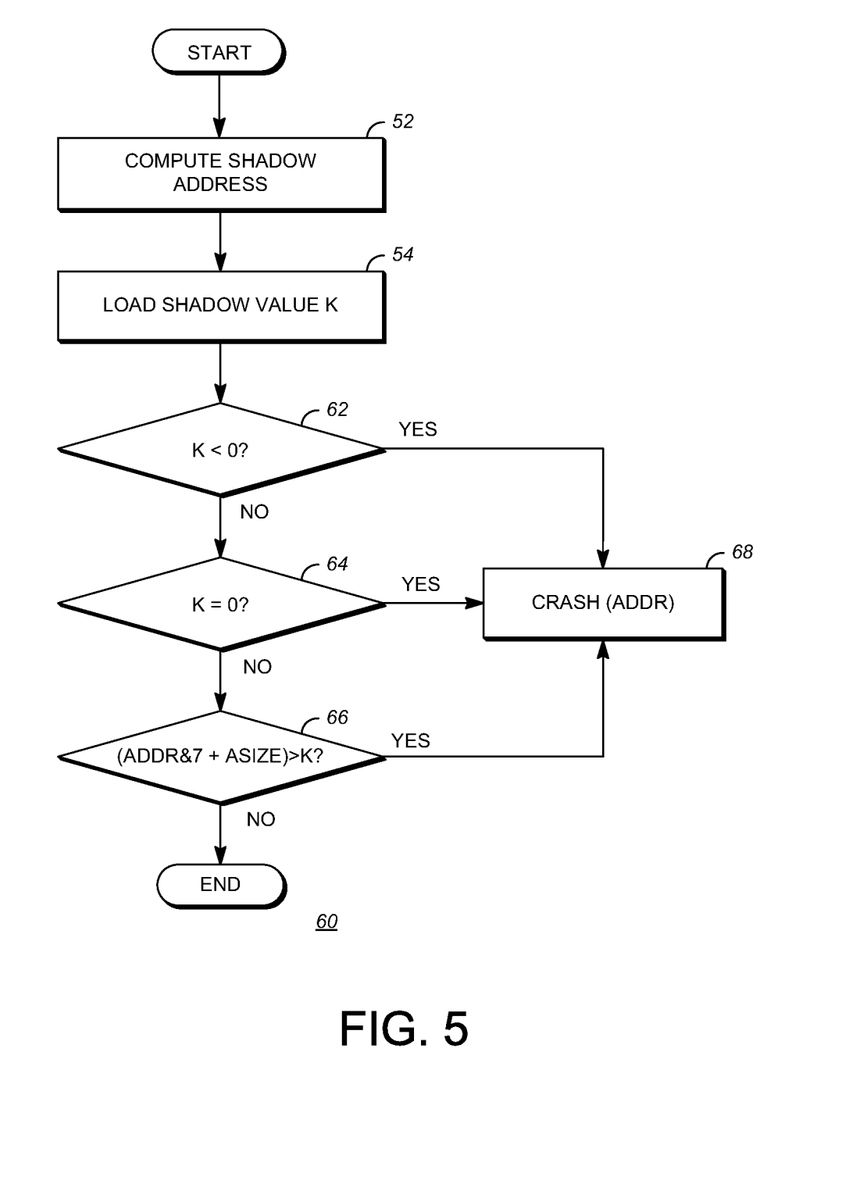
FIG. 5 is a flowchart of a process to check memory addresses according to another embodiment.

FIG. 5 is a flowchart of a process 60 to check memory addresses according to another embodiment. Process 60 can occur during execution of an application program loaded into computer 10, when the program performs a memory access. In this implementation, process 60 instruments a 1-, 2- or 4-byte access for 8-byte words. Process 60 begins with computing the shadow address in step 52 and loading the shadow value in step 54. For example, the shadow address can be de-referenced to obtain the value of k stored in the shadow memory (e.g., high shadow memory 24 or low shadow memory 28) at the shadow address. Shadow value k is used to determine whether the memory address is properly allocated to the application program.

At step 62, shadow value k is compared to a value. In the example of assigning shadow values of FIG. 2, when shadow value k is less than 0 in step 62, error reporting code included in the application program when compiled is executed by, for example, CPU 12 in step 68. The error reporting code in step 68 can be similar to the error reporting code in step 58 of FIG. 4. If shadow value k is greater than or equal to 0 in step 62, shadow value k is again compared to 0 in step 64. If shadow value is equal to 0 in step 64, the error reporting code can be executed in step 68. Steps 62 and 64 can be combined. They are shown separately here to reflect that instrumenting an 8-byte memory access (e.g., wherein k=0) could be combined with process 60 by, for example, providing additional processing when the response to the query of step 64 is yes. In contrast, a "yes" response to the query of step 62 indicates an error in each of the described examples.

If shadow value k is not equal to 0 in step 64, shadow value k is positive. When shadow value k is positive (e.g., 1 to 7), it means that the first k bytes of the 8-byte word are addressable. The remaining 8-k bytes are not. Process 60 advances to step 66 to compare the last three bits of the original address to the shadow value to determine if the requested access to the application memory is legal. In the implementation shown, the original address ADDR is combined through an AND function with the value 7 (e.g., 111), which masks off all but the low-order three bits to form the start address within the eight-byte word to be accessed in user memory 20. Also, the number of bytes ASIZE to access is added to the resulting masked value to compute the number of the last byte of the eight-byte word to be accessed. The summed total is compared to k. If the number is greater than k, process 60 advances to step 68 to execute the error reporting code. Otherwise, processing in FIG. 5 ends because the attempted memory access does not exceed the available memory access.

Alternative embodiments to those in FIGS. 4 and 5 use processes similar to those shown, but step 58 or step 68, whichever is applicable, is replaced by an error handling process comprising two steps. In the first step, the application program computes a check pointer. The value of the check pointer is determined arithmetically from the value of the original address of the location in application memory that the application program attempted to access. The arithmetic formula used to determine the check pointer results in an address value in an unmapped memory region such as bad memory 26.

More particularly, this alternative embodiment can be used with the masks described above and with Table 2 below, which is a set of hexadecimal addresses in 64-bit notation corresponding to another example of memory allocations for memory space 20 other than those shown in FIG. 2.

| Start Address | End Address | Name |
| --- | --- | --- |
| 0x00007f0000000000 | 0x0000800000000000 | High Memory |
| 0x00003e0000000000 | 0x0000400000000000 | High Bad |
| 0x00001f0000000000 | 0x0000200000000000 | High Shadow |
| 0x0000080000000000 | 0x0000100000000000 | Low Bad |
| 0x0000040000000000 | 0x0000080000000000 | Low Shadow |
| 0x0000000000000000 | 0x0000040000000000 | Low Memory |

With the memory allocation such as shown in Table 2, the computation of the check pointer can be accomplished by multiplying the shadow address by two. If the shadow address is in the low shadow region, then the check pointer will be in the low bad region after the computation. If the shadow address is in the high shadow region, for example, then the check pointer will be in the high bad region after the computation.

In the second step, the application program stores a telltale value (determined as described below) at the memory location at the address corresponding to the value of the check pointer. The attempt to store the telltale value at this forbidden location will generate a runtime error such as a page fault. The generation of this error can alert the programmer that the application program has made an illegal memory access, as well as provide the telltale value.

The telltale value is a number that contains information about the operation of the application program at the time it attempted to improperly access the memory. For example, the value can be equal to:

(memory_access_size)+(16*memory_access_is_write);
wherein memory_access_size indicates the size of the access in bytes; and memory_access_is_write is a boolean value indicating whether the access type was a read access or a write access. The resulting number can be analyzed after the error is generated to extract information as to the memory access size and access type. This telltale value can be displayed when the runtime error is generated.

It will be appreciated that the generation of the runtime error does not require any special error handling code to be executed by the instrumentation. Nor does it require significant processor or memory overhead. In effect, by forcing a page fault (that is, by attempting to read in an unmapped region), efficient and low overhead error generation is accomplished.

The following is an example of computer code that can be used to implement the foregoing embodiment:

```
---------------- Before ------------
void write(int *a) {
   *a = 1;
}
---------------- After ------------
void write(int *a) {
  uintptr_t shadow_address = (uintptr_t)a;
  shadow_address |= 0x0000040000000000; // apply the Low Mask
  shadow_address &= ~0x0000060000000000; // apply the High mask
  shadow_address += 64; // to avoid cache bank conflicts
  if (*(int*)(shadow_address)) { // if value stored at the shadow address is
  not zero
       char *bad_address = (char*)(shadow_address * 2); // set ptr to bad
       address
       *bad_address = kAccessSize + 16 * kAccessIsWrite; // write to bad
       address
// a fault is generated
  }
  *a = 1;
}
```

Figure 6:
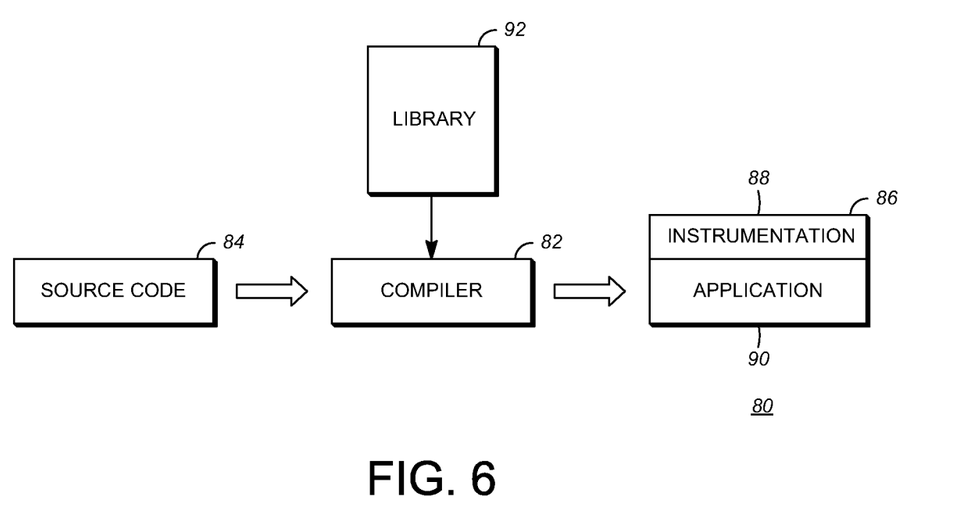
FIG. 6 is a block diagram of a system including a compiler that accepts as input source code and generates as output executable code including instrumentation for performing embodiments described herein.

FIG. 6 is a block diagram of a system 80 including a compiler 82 that accepts source code 84 as input and generates executable code 86 as output. Executable code 86 includes instrumentation code 86 used in performing embodiments taught herein, such as processes 40, 50 and 60. Source code 84 can be generated by a human programmer using a text editor or programming tool. Code for creating instrumentation code 86 is contained in a library 92 that is accessible by compiler 82. Library 92 is also called run-time library herein. Executable code 86 generated by compiler 62 includes compiled application code 90, also called the application program, into which instrumentation code 88 is inserted.

Out-of-bounds accesses to heap, stack and global objects can also be detected using embodiments described herein. These types of memory objects can be allocated automatically by the compiled code, for example, and therefore do not require a malloc library call to allocate memory. In an implementation, redzones for global variables can be created at compile time, and their addresses can be passed to run-time library 92 at application start-up. Run-time library 92 manages shadow memory access and desirably maps the entire shadow region at application program startup. Run-time library 92 "poisons" the redzones surrounding the global variables (e.g., populates them with negative values) and records the addresses for further error reporting.

For stack memory objects, redzones can be created and poisoned (e.g., populated with negative values) at runtime according to an implementation. Redzones of 32 bytes, plus up to 31 bytes for alignment, can be used. This can be accomplished by pre-processing application program code before compiling that inserts additional code to populate shadow memory with appropriate values for valid and invalid accesses. The following code fragment is an example of an application program stack memory allocation before and after instrumentation according to an embodiment described with respect to FIG. 4 and/or FIG. 5:

```
---------------- Before ------------
void foo(int *a) {
    char a[10];
    <function body>}
---------------- After ------------
void foo(int *a) {
  char rz1[32];
  char arr[10];
  char rz2;
  unsigned *shadow = (unsigned*)(((long)rz1>>8)+Offset);
  // poison redzones around arr.
  Shadow[0] = 0xffffffff; // rz1
  Shadow[1] = 0xffff0200; //arr and rz2
  Shadow[2] = 0xffffffff; // rz2
  <function body>
  // un-poison all.
  shadow[0] = shadow[1] = shadow[2] = 0; }
```

In the before code fragment above, an array (arr) of ten (10) characters is to be automatically allocated on the stack belonging to the routine "foo". In the after code fragment, i.e., the transformed code, an array of 32 characters (bytes) is allocated for a first redzone (rz1) before the character array (arr) and a second redzone (rz2) is allocated after the character array. A pointer to the shadow memory is initialized by creating a shadow memory pointer to the beginning of the stack variables. The first and second redzones (Shadow[0] and Shadow[2]) are populated with four signed bytes equal to −1, and the first two bytes of the shadow memory representing the stack (Shadow[1]) are set to signed bytes representing −1 to indicate a redzone. The lowest order byte is set to 00 to represent valid data and the next lowest order byte is set to 02 to represent the number of valid bytes out of the possible eight bytes that are legal to reference.

The software code (e.g., instrumentation code 88) to implement the foregoing embodiment can be injected into an application program 90 using a pre-processor or by modifying compiler 82 to inject code 88 when program 90 is compiled. A compiler analysis technique can be applied to minimize the number of instrumented access. For example, there would be no need to provide an instrumented access for application program 90 in cases where compiler 82 can statically prove correctness. Instrumentation can be done by a binary translator or by a source-to-source transformation.

The memory allocations of FIG. 2 are examples, and other configurations can be used. In other embodiments, at least one region of memory can be provided by the operating system for use by the application program to store and retrieve data. A second region of memory is provided for storing shadow values. A third region of memory is provided that is unmapped such that an access to the third region will generate an error. Alternatively, memory can be divided into five regions as shown in FIG. 2 with two regions (high and low) for use by the operating system, two more regions for storing shadow values and an additional region that is unmapped. The use of non-overlapping regions as described in the example can reduce conflict and error.

Likewise, the specific boundary values shown in the tables are merely exemplary. For example, the following allocation can be used in a 32-bit system. The mapping of application memory to shadow memory is one-byte-to-one-bit:

| Lower Bound | Upper Bound | Name |
| --- | --- | --- |
| 0x00000000 | 0x20000000 | Low Memory |
| 0x20000000 | 0x24000000 | Low Shadow |
| 0x30000000 | 0x40000000 | High Shadow |
| 0x40000000 | 0x80000000 | Bad |
| 0x80000000 | 0x100000000 | High Memory |

The specific mapping functions used to map original memory addresses to shadow or bad memory addresses are also merely examples. With the 32-bit example provided above, for example, the original address $A_{ORIGINAL}$ can be converted to a shadow address $A_{SHADOW}$ by performing a three-bit shift right bit operation as follows:

$$A_{SHADOW}=(A_{ORIGINAL}>>3) \text{ OR Mask;} \qquad (3)$$

wherein Mask=0x 20000000. As in the examples above, the OR function is a bitwise function. The conversion from original address to bad address (i.e., a memory address in bad memory) can be accomplished by multiplying $A_{SHADOW}$ by 2.

In the foregoing examples, the conversion functions are relatively fast (consuming very few processor cycles). They can be performed without the use of "if" statements. Multiplying by 2 to derive the bad address is a particularly fast operation. The conversion functions can also be reversible. In the claims, "simple transfer function" means a function that converts an original address to an address in separate shadow memory space, is reversible and does not require branching instructions but rather can be implemented solely with arithmetic operations, bit shifts or logical operations such as AND, OR and XOR.

The approach described above could also be applied to 32-bit programs with some modifications as mentioned above. Memory space 20 described in FIG. 2 is but one of many possible memory layouts that may be used. For example, part of the application memory may reside in the range of $2^{47}$ to $2^{48}$ or similar ranges. The techniques described herein can be extended to find other classes of memory access errors such as, for example, uninitialized reads.

An aspect of memory fault detection systems that can be measured is the increase in application program size due to instrumenting the application program to detect memory faults. The increase in memory usage by embodiments described herein has been measured for a mix of benchmark application programs and has been found to be an average of about 5×, or more particularly about 3.37×. This means that the number of memory bytes occupied by an application program increases by about a factor of 5×, or more particularly a factor of about 3.37×, when instrumented as described herein.

Another aspect of memory fault detection systems that can be measured is the average slowdown in application program execution time due to instrumenting the application program to detect memory faults. The average slowdown in execution speed by embodiments described herein has been measured for a mix of benchmark application programs (SPEC CPU2006) and found to be less than about 100%, or more particularly about 73%. This means that the execution speed of the benchmark application programs slowed down by an average of less than about 100%, or more particularly by an average of about 73%, when instrumented as described herein.

All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for detecting a fault in operation of a computer having a processor and a memory, comprising:
identifying a first portion of the memory and a second portion of the memory, each addressable by an application program operating on the computer; wherein the first portion and the second portion are non-overlapping;
identifying an instruction within the application program that results in the computer performing a memory access to a first address within the first portion;
determining a second address within the second portion, the second address determined by applying a first arithmetic operation to the first address;
determining a first value stored in memory at the second address, the first value indicative of whether the first address is allocated for use by the application program; and
if the first value indicates that the first address is not allocated for use by the application program, executing error reporting code indicating that an improper memory access has been attempted.

2. The method of claim 1, further comprising:
identifying an instruction within the application program that results in the computer performing a memory access to the second address within the second portion;
identifying a third portion of the memory not addressable by the application program such that an attempt to access an address in the third portion of the memory by the application program will cause the computer to generate an error signal; wherein the first portion, the second portion and the third portion are non-overlapping; and
determining a third address within the third portion, the third address determined as a result of performing at least a second arithmetic operation on the second address; and
executing an instruction to access a memory location at the third address such that the computer generates a runtime error.

3. The method of claim 1 wherein executing the error reporting code comprises:
causing a hardware exception if the first value indicates that the first address is not allocated for use by the application program.

4. The method of claim 1 wherein executing the error reporting code comprises:
causing a software exception if the first value indicates that the first address is not allocated for use by the application program.

5. The method of claim 1, further comprising:
identifying a third portion of the memory and a fourth portion of the memory, each addressable by the application program; wherein the first portion, the second portion, the third portion and the fourth portion are non-overlapping;
identifying an instruction within the application program that results in the computer performing a memory access to a third address within the third portion;
determining a fourth address within the fourth portion, the fourth address determined by applying a second arithmetic operation to the third address;
determining a second value stored in the memory at the fourth address, the second value indicative of whether the third address is allocated for use by the application program; and if the second value indicates that the third address is not allocated for use by the application program, executing the error reporting code.

6. The method of claim 5 wherein each of the second portion and the fourth portion has a size smaller than a size of the first portion and the third portion.

7. The method of claim 5 wherein applying the first arithmetic operation to the first address comprises mapping the first address to the second address by right shifting the first address by a scale value and adding a positive offset value based on a relationship of addresses of the first portion to addresses of the second portion within the memory; and wherein applying a second arithmetic operation to the third address comprises mapping the third address to the fourth address by right shifting the third address by the scale value and adding a negative offset value based on a relationship of addresses of the third portion to addresses of the fourth portion within the memory.

8. The method of claim 7 wherein an absolute value of the negative offset value is equal to the positive offset value.

9. The method of claim 1 wherein applying the first arithmetic operation to the first address comprises mapping the first address to the second address by right shifting the first address by a scale value and adding an offset value based on a relationship of addresses of the first portion to addresses of the second portion within the memory.

10. The method of claim 1 wherein the memory is a multi-byte memory and the first value is one of:

0, which represents that all bytes of the first address are allocated for use by the application program;

a negative value, which represents that no bytes of the first address are allocated for use by the application program; or an integer k, wherein 0<k<a word size of the multi-byte memory, which represents that a first k bytes of the first address are allocated for use by the application program.

11. The method of claim 10 wherein the negative value comprises a plurality of negative values, each of the plurality of negative values a different kind of memory not allocated for use by the application program.

12. An apparatus for detecting a fault in the operation of a computer comprising:

a memory; and a processor configured to execute instructions stored in the memory to:

identify a first portion of the memory and a second portion of the memory, each addressable by an application program operating on the computer; wherein the first portion and the second portion are non-overlapping;

identify an instruction within the application program that results in the computer performing a memory access to a first address within the first portion;

determine a second address within the second portion, the second address determined by applying a first arithmetic operation to the first address;

determine a first value stored in memory at the second address, the first value indicative of whether the first address is allocated for use by the application program; and if the first value indicates that the first address is not allocated for access by the application program, execute error reporting code indicating that an improper memory access has been attempted.

13. The apparatus of claim 12 wherein the processor is configured to:

identify an instruction within the application program that results in the computer performing a memory access to a second address within the second portion;

identify a third portion of the memory not addressable by the application program such that an attempt to access an address in the third portion by the application program will cause the computer to generate an error signal; wherein the first portion, the second portion and the third portion are non-overlapping;

determine a third address within the third portion, the third address determined by performing at least a second arithmetic operation on the second address; and execute an instruction to access a memory location at the third address such that the computer generates a run-time error.

14. The apparatus of claim 12 wherein the processor is configured to, before identifying the instruction within the application program that results in the computer performing the memory access to the first address within the first portion:

identify at least one address of a plurality of addresses within the first portion that is allocated for use by the application program;

determine a respective second address within the second portion, each respective second address determined by applying the first arithmetic operation to the at least one first address;

set a value at each respective second address indicating that each respective second address is allocated for use by the application program; and set other second addresses of the second portion to a value indicating that the other second addresses are not allocated for use by the application program.

15. The apparatus of claim 14 wherein the processor is configured to:

set the other second addresses to a negative value to indicate that the other second addresses are not allocated for use by the application program.

16. The apparatus of claim 15 wherein the processor is configured to set the value at each respective second address indicating that each respective second address is allocated for use by the application program by:

setting the value to 0 at each respective second address.

17. The apparatus of claim 15 wherein the memory is a multi-byte memory and wherein the processor is configured to set the value at each respective second address indicating that each respective second address is allocated for use by the application program by:

setting the value to an integer k at each respective second address, wherein 0<k<a word size of the multi-byte memory.

18. The apparatus of claim 12 wherein the error reporting code comprises at least one of:

a code causing a hardware exception;

a code causing a software exception; and a function call having the first address as an argument.

19. The apparatus of claim 12 wherein the processor is configured to:

apply the first arithmetic operation to the first address by right shifting the first address by a scale value and adding an offset value based on a relationship of addresses of the first portion to addresses of the second portion within the memory.

20. The apparatus of claim 12 wherein the processor is configured to:

identify a third portion of the memory and a fourth portion of the memory, each addressable by the application program; wherein the first portion, the second portion, the third portion and the fourth portion are non-overlapping;

identify an instruction within the application program that results in the computer performing a memory access to a third address within the third portion;

determine a fourth address within the fourth portion, the fourth address determined by applying a second arithmetic operation to the third address;

determine a second value stored in the memory at the fourth address, the second value indicative of whether the third address is allocated for use by the application program; and if the second value indicates that the third address is not allocated for use by the application program, execute the error reporting code.

* * * * *